United States Patent
Dettling et al.

[11] Patent Number: 5,975,619
[45] Date of Patent: Nov. 2, 1999

[54] FOLDING TOP FOR VEHICLES

[75] Inventors: Lothar Dettling; Astrid Harting; Sabine Hollik, all of Sindelfingen; Juergen Schrader, Weil im Schoenbuch, all of Germany

[73] Assignee: DaimlerChrysler AG, Germany

[21] Appl. No.: 08/923,645

[22] Filed: Sep. 4, 1997

[30]  Foreign Application Priority Data

Sep. 4, 1996 [DE] Germany ............... 196 35 869

[51] Int. Cl.⁶ ...................................... B60J 7/20
[52] U.S. Cl. ........................ 296/107.08; 296/107.17
[58] Field of Search ................. 296/107.08, 107.17

[56]     References Cited

U.S. PATENT DOCUMENTS

| | | | |
|---|---|---|---|
| 4,796,943 | 1/1989 | Fukutomi et al. | 296/107.17 |
| 5,197,778 | 3/1993 | Burst. | |
| 5,823,606 | 10/1998 | Schenk et al. | 296/107.08 |

FOREIGN PATENT DOCUMENTS

| | | |
|---|---|---|
| 44 46 483 A1 | 6/1996 | Germany. |
| 195 07 431 C1 | 8/1996 | Germany. |
| 6-191285 | 7/1994 | Japan. |
| 6-28340 | 8/1994 | Japan. |

*Primary Examiner*—Gary C. Hoge
*Attorney, Agent, or Firm*—Evenson, McKeown, Edwards & Lenahan, P.L.L.C.

[57]     ABSTRACT

A folding top is provided for vehicles, with the top being lowered into a rear storage compartment of the vehicle when the top is open. The upwardly directed opening of the rear storage compartment is covered by at least one lid which can be displaced for closing the top into a deflecting position that provides the pivoting clearance for the top. The lid has a supporting means arrangement which, when folding top is lowered and the lid cooperates with a corresponding supporting means arrangement of the folding top so that the folding top can be secured by the locking means of the lid.

10 Claims, 4 Drawing Sheets

FOLDING TOP FOR VEHICLES

BACKGROUND AND SUMMARY OF THE INVENTION

This application claims the priority of German application 196 35 869.8, the disclosure of which is expressly incorporated by reference herein.

The present invention relates to a folding top for vehicles, with the top being lowered into a rear storage compartment of the vehicle when the top is open, with the upwardly directed opening of the rear storage compartment being covered by at least one lid that can be displaced for closing the top into a deflecting position that provides the pivoting clearance for the top.

DE 44 46 483 A1 describes a known folding top with the upwardly directed opening of the rear storage compartment being covered by a cover plate in the forward area and by a rear lid which can be folded upwardly and rearwardly behind the cover plate when the folding top is lowered. In its lowered storage position, the folding top is secured below the closed covers but is not secured in the rear storage area in such manner that it will not rattle, especially under the influence of acceleration forces when driving.

Also, DE 195 07 431 C1 describes a folding top in which two latching hooks project from the folding top in the vicinity of the forward end of the roof. The hooks engage matching retaining bolts at the forward edge of the roof above the windshield when the top is closed. When the top is open, the latching hooks instead are each locked to a matching retaining lug that projects rearward from a forward limiting wall of the rear storage area. The folding top, in its storage position, is locked secured in a rattle-free manner in the rear storage area.

In order to close the known folding top, however, the latching hooks must first be unlocked from their retaining lugs so that the folding top is released. For this purpose, with manual top operation, an additional operating procedure is required, and for automatic top operation, an additional control expense is required. In addition, this type of locking is suitable only for folding tops in which immovable retaining lugs can be located without difficulty in the forward end area of the rear storage compartment, because this compartment need not serve as a location or provide clearance for movement of other components.

An object of the present invention is to improve a folding top so that it can be secured in the rear storage area in its stored position without the retaining means that project immovably from the body being required.

The foregoing object has been achieved according to the present invention by providing that the lid has a supporting means arrangement which, when folding top is lowered and the lid cooperates with a corresponding supporting means arrangement of the folding top so that the folding top can be secured by the locking means of the lid.

Because the cooperating supports are located on the foldably movable folding top, on one hand, and on the cover which can be moved into a deployed position, on the other hand, it is moved outward together with the folding top and/or the cover and thus out of the rear storage compartment. Limitation of the space available in the rear storage compartment can therefore be largely avoided.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
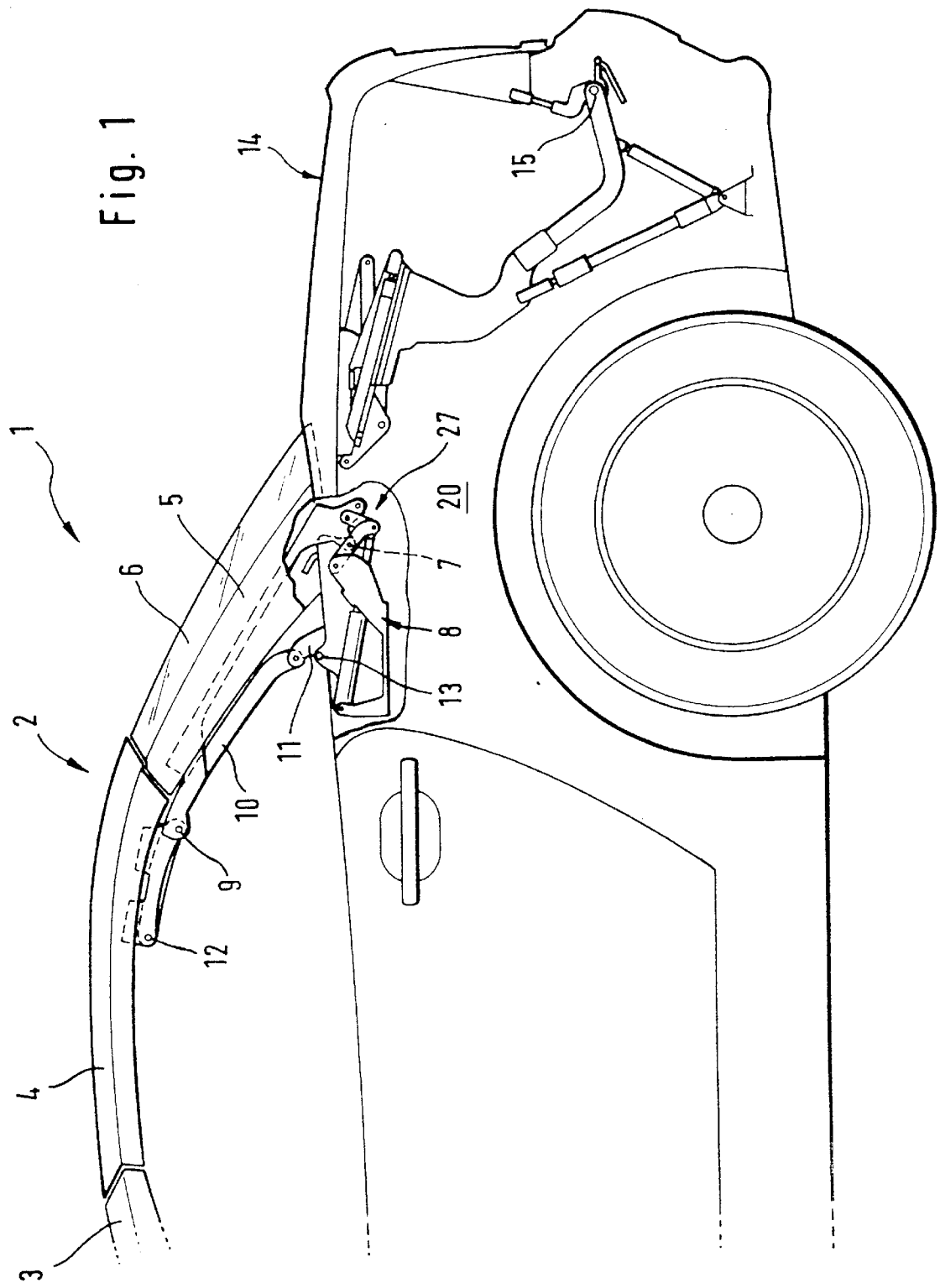
FIG. 1 is a side view of part of a convertible, looking at the rear area thereof with the folding top closed.

A convertible designated generally by numeral 1 is shown in FIG. 1 in the area located rearwardly of the windshield, in which a folding top 2 of convertible 1 is movable. The folding top 2 is a two-part solid roof that spans the interior of convertible 1 in the closed position and is locked at its forward end to body frame 3 that runs above the windshield. For this purpose, it comprises a forward roof shell 4 which is lockable to body frame 3 and a rear roof shell 5 with a large rear window 6. Rear roof shell 5 has lateral C-pillars which are each articulated with a lower lever arm by a hinge joint 7 with an associated bearing bracket 8. Bearing brackets 8 are lowerable laterally into the side walls and are connected relatively immovably with the body. Thereby, the rear roof shell 5 is pivotably mounted by the hinge joint 7 so that it can move around a horizontal transverse axis of the vehicle which runs below the upper edge of the side wall, the axis constituting the main pivot axis of folding top 2.

In the upper end area, the C-pillars, inclined diagonally forward, of roof shell 5 have an additional lever arm whose projecting ends are connected by hinge joints 9, likewise provided with mirror symmetry on both sides of the roof, with the rear end area of roof shell 4 that forms the upper roof area. With an extent that runs approximately parallel to the C-pillars, to control the movement of roof shell 4 as a function of the backward pivoting movement of roof shell 5, a main link 10 and a control lever 11 are provided on each side and connected with one another with articulation at one end. The upper end of main link 10 is articulated at a distance from hinge joint 9 by hinge joint 12 to the roof shell 4, and control lever 11 is articulated at an equal distance in front of the hinge joint 7 by hinge joint 13 to the bearing bracket 8. Thereby, the roof shell 4 is guided in the same manner as by a parallelogram linkage.

The opened folding top 2 can be lowered completely into a rear storage compartment 20 extending over the entire width of the rear of convertible 1. Behind the roof shell 5, the upwardly directed opening of rear storage compartment 20 is covered by a rear lid 14 which can be folded upward and rearward around an approximately horizontal transverse axis 15 of the vehicle after a conventional type of latch is released.

In order for folding top 2 to be positioned exactly behind body frame 3 when the top is closed, two centering pins 16 project from the forward end of roof shell 4. The pins 16 are located with mirror symmetry laterally next to known types of forward top latches, relative to the lengthwise central plane of convertible 1. These centering pins 16 are mounted relatively immovably on roof shell 4 and, when folding top 2 is closed, enter centering bores, located in a funnel-shaped expanded opening of body frame 3, so that as it is advanced further, the roof shell 4 is aligned relative to body frame 3.

Figure 2:
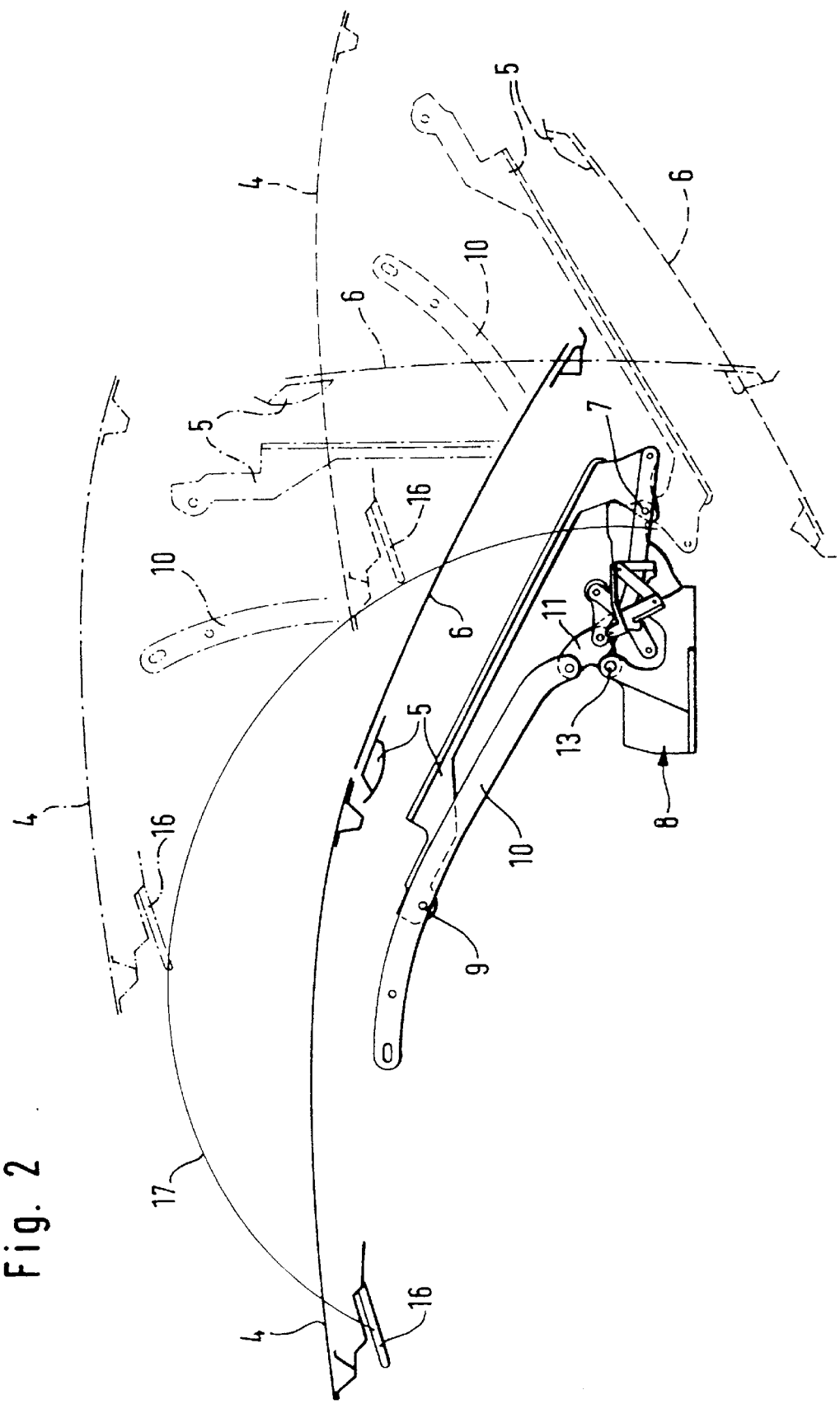
FIG. 2 is a lengthwise section through the folding top of FIG. 1 in several positions during the folding process.

The folding top 2 is shown separately in FIG. 2 and the path of the section is located such that one of centering pins 16 is visible. In addition to the closed position drawn with solid lines, an intermediate position at an opening angle of 30 degrees is represented by dot-dashed lines, and another, further opening position at an opening angle of about 80 degrees is shown by dashed lines. This indicates that centering pin 16, during the process of opening folding top 2, is moved rearward and downward along an approximately circular path, as indicated by curve 17. In the area where it overlaps bearing bracket 9, centering pin 16 moves along a nearly perpendicular circular portion that is inclined slightly forward.

Figure 3:
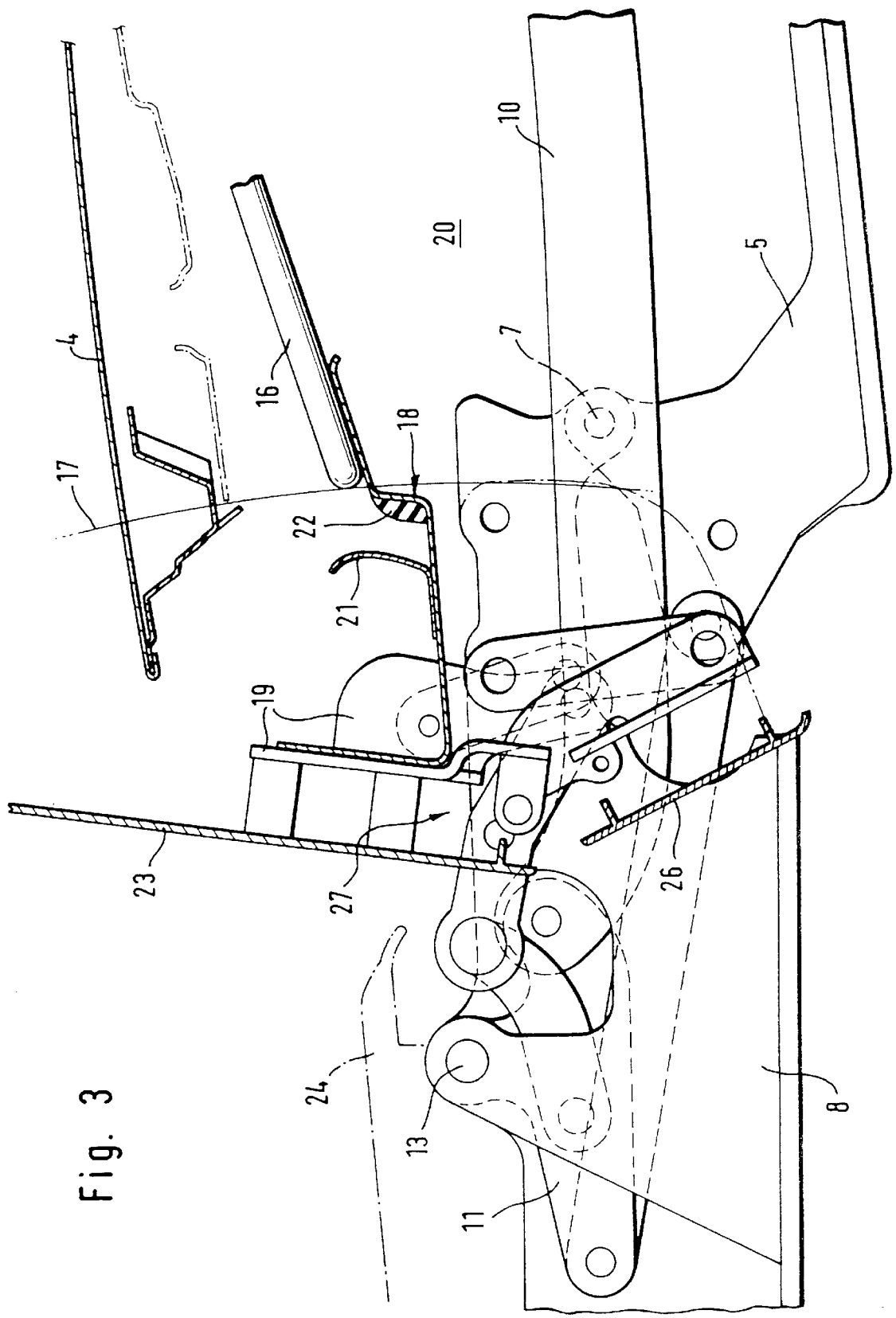
FIG. 3 is a side view of a lateral drive linkage of the aforementioned folding top with a cover panel and with the top mostly open.

As folding top 2 continues to pivot, centering pins 16, at an opening angle of about 98 degrees, strike rearwardly projecting trapping legs of an associated pin receptacle 18, as shown in FIG. 3. This trapping leg extends upon impact approximately parallel to centering pin 16, in other words, slightly diagonally downward and forward, and is bent downward approximately perpendicularly immediately in front of the end of centering pin 16. The step thus formed terminates after a few centimeters in another bend, where the trapping leg extends approximately horizontally forward. The trapping leg of pin receptacle 18 terminates on the underside of a steeply aligned striker part 19 to which it is fastened.

At a distance from centering pin 16, a fork leg 21 projects steeply upward from the trapping leg of pin receptacle 18 on which it is fastened. The fork leg extends slightly further upward than the forward end of centering pin 16 and being curved slightly forward in the upper end area. Fork leg 21 and the lengthwise section of the trapping leg which is bent approximately parallel thereto thus delimit at front and rear a rectangular groove whose hollow cross section is narrowed approximately to the diameter of centering pin 16 by a plastic support 22 fastened to the trapping leg, and provided with good damping properties.

Striker part 19 is one of two striker parts 19 located with mirror symmetry to secure a cover panel 23 laterally and move together with the latter. During the lowering process, this cover panel 23, as can be seen in FIG. 3, is secured in a nearly vertical transverse plane of the vehicle behind a cover 24 that limits the opening of rear storage compartment 20 at the front. Thus, it is in a deflected position in which space is available for the pivoting movement that lowers folding top 2. When folding top 2 is closed, cover panel 23 serves as a parcel shelf covering the storage compartment opening behind cover 24 up to the inner circumference of roof top 5. Of course its circumferential contour is largely adapted for this purpose to the arcuate contour of roof shell 5.

Figure 4:
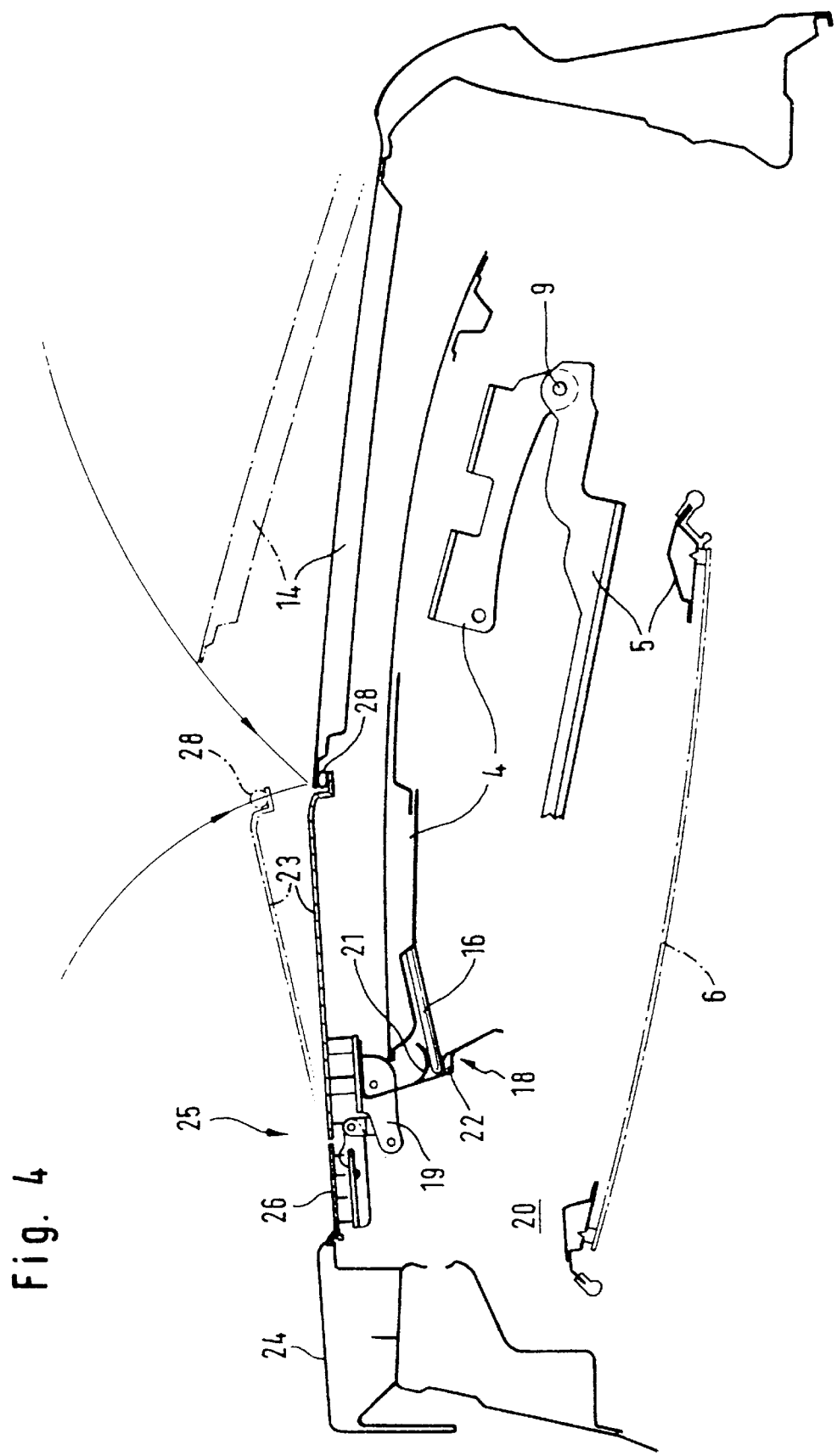
FIG. 4 is a lengthwise section through the rear storage compartment with the folding top completely lowered and secured in its storage position.

In order to allow the storage compartment opening of rear storage compartment 20 to be covered completely when the folding top 2 is lowered, the cover panel 23 forms part of the panel cover 25 that additionally includes a narrower cover panel 26. When folding top 2 is closed, cover panel 26 is secured in a non-use position in which it is located below the cover plane behind the transverse member of the body covered by covering 24. When folded top 2 is open, on the other hand, cover panel 23 as shown in FIG. 4 is displaced rearward until it overlaps the forward marginal edge of rear top 14 and the opening area of top storage compartment 20 located in front is covered by cover panel 26 folded into the covering plane of cover panel 23. Conversely, then folding top 2 is closed, cover panel 26 is folded down into its non-use position, and cover panel 23 is initially displaced forward and folded up into its deflecting position before being folded down into its covering position as a parcel shelf.

In order for the movements of panel cover 25 to proceed reliably as a function of the folding movement of top 2, rod drives 27 are provided with mirror symmetry, laterally of bearing brackets 8. These drives 27 coordinate the movements of cover panels 23, 26 and controlling them positively as a function of the pivoting movement of top 2.

Because of the motion control thus provided, cover panel 23 in the last opening movement phase of top 2 is folded down into this covering position until it reaches the open position shown in FIG. 4 and is then displaced rearward. Centering pins 16 at this time are moved further downward on their travel curve 17 to cause the trapping leg of pin receptacle 18 to enter a position in which it is at right angles to centering pin 16 which is pushed with its free end area into the fork-shaped groove between plastic cover 22 and fork leg 22 until its end comes to rest at the highest point on the contour of the trapping leg. A hole is provided in the bottom of the groove so that the centering pin 16, if tolerance is unsatisfactory, does not force the pin receptacle out of its position as determined by design (hole for releasing centering pin).

In order for centering pin 16 to be pressed downward under a pretensioning force against plastic cover 22 of its pin receptacle 18, fork leg 21 is made of spring steel and is curved such that fork leg 21, in the last folding movement phase of cover panel 23, is bent upward by centering pin 16. Folding top 2 is thus reliably secured when cover panel 23 is forced down into its end position.

In order to ensure that no further locks are required to secure panel cover 25 in its covering position according to FIG. 4, cover panel 23 has a marginal zone bent downward and rearward along its rear circumferential side, with a sealing profile 28 fastened thereto. This marginal zone, as indicated by the arrows, is covered by the forward marginal zone of downwardly folded rear lid 14 and pushed down with interposition of sealing profile 28. Therefore, cover panel 23 is secured in its end position by locking means of rear lid 14. All conventional latches used in top compartment lids are suitable for use as locking means for rear lid 14. The latches are able to pull rear lid 14 into its closed position against the sealing forces of sealing profile 28, as for example in the rotary trap latches of known design that latch in two stages.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top for a vehicle configured to be lowered into a rear storage compartment of the vehicle when the folding top is open, comprising at least one displaceable lid configured to cover an upwardly directed opening of the rear storage compartment for closing the folding top into a deflecting position providing pivoting clearance for the folding top, wherein the lid has a supporting arrangement which, when the folding top is lowered and the lid cooperates with corresponding supports of the folding top, secures the folding top by locking the lid.

2. The folding top according to claim 1, wherein the folding top is a solid roof comprising a forward roof shell and a rear roof shell articulated to the vehicle body, with the forward roof shell being articulatingly connected with rear roof shell.

3. The folding top according to claim 1, wherein two centering pins project from the folding top in a forward roof edge area, said pins, when the folding top is closed, engaging in centering openings of a forward roof frame of the windshield and, when the folding top is open, serving as supports in the associated support arrangement of the lid.

4. The folding top according to claim 3, wherein the upwardly directed opening of the rear storage compartment, when the folding top is lowered, is covered in the forward area by a panel cover comprising the lid and by a rearwardly and upwardly foldable rear lid located therebehind, with pin receptacles comprising the support arrangement being located on the panel cover.

5. The folding top according to claim 4, wherein the panel cover has a rear marginal zone covered by a forward marginal zone of the closed rear lid when the folding top is open.

6. The folding top according to claim 3, wherein pin receptacles are configured in a fork-like manner and fit around the associated centering pins on bottom and top thereof.

7. The folding top according to claim 6, wherein an upper fork leg of the pin receptacle is spring-elastic and abuts a top of the surrounded centering pin with pretensioning.

8. The folding top according to claim 6, wherein the pin receptacles are provided with a damping covering on which the associated centering pins rest when the folding top is lowered.

9. The folding top according to claim 4, wherein the panel cover is movably coupled with an associated frame member of the folding top by laterally disposed rod drives.

10. The folding top according to claim 1, wherein the panel cover is displaced forwardly when the folding top is closed to form a parcel shelf in front of the rear window.

* * * * *